Sept. 3, 1940.  G. E. TIGNER  2,213,233

AIR FILTER

Filed March 11, 1939

INVENTOR.
GEORGE E. TIGNER.
BY *Victor J. Evans & Co.*
ATTORNEYS.

Patented Sept. 3, 1940

2,213,233

UNITED STATES PATENT OFFICE 2,213,233

AIR FILTER

George E. Tigner, Taft, Calif.

Application March 11, 1939, Serial No. 261,285

2 Claims. (Cl. 183—110)

This invention relates to improvements in air filters and has particular reference to an air filter for internal combustion engines and the like. It is, however, obvious that the same might be applied to air conditioning, the purpose being to strain dust from the air.

A further object is to produce a device of this character which permits of a free flow of air through the air conditioner, and yet one which will collect the dust therefrom.

A further object is to produce a device of this character which is simple in construction and, therefore, economical to manufacture.

A still further object is to provide means for removing the dirt collected within the device.

A still further object is to produce a device which is compact and readily adaptable to the standard motor equipment.

Other objects and advantages will be apparent during the course of the following description.

In the accompanying drawing forming a part of this specification and in which like numerals are employed to designate like parts throughout the same, Fig. 1 is a side elevation of my device, having a portion thereof broken away;

The ordinary air filter usually introduces a filtering medium through which the air passes, such a medium being steel wool coated with oil, or spun glass coated with oil; and this type of filter impedes the free travel of the air through the filter.

I have, therefore, devised a filter which permits the free flow of air.

Figure 1:
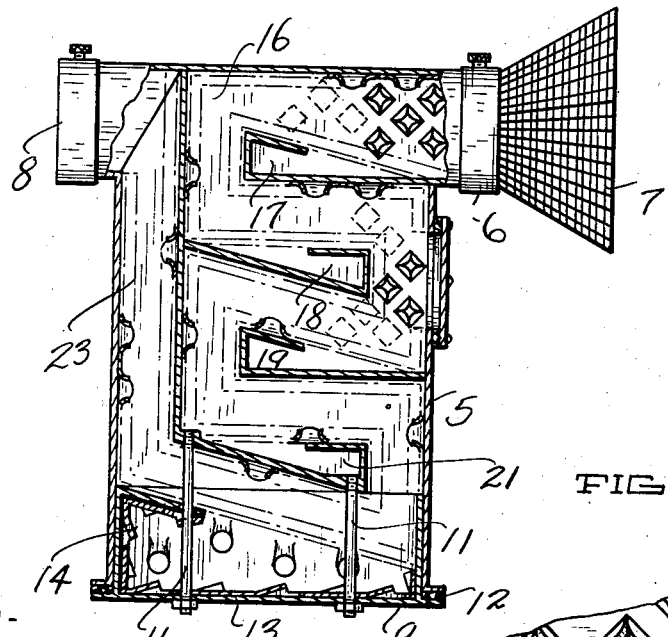
Figure 2:
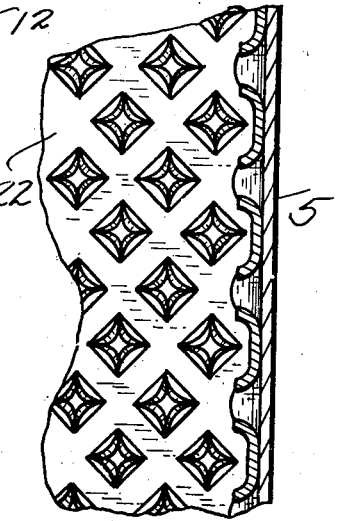
Fig. 2 is an enlarged fragmentary detailed view, showing a portion of the filter surface.
Figure 3:
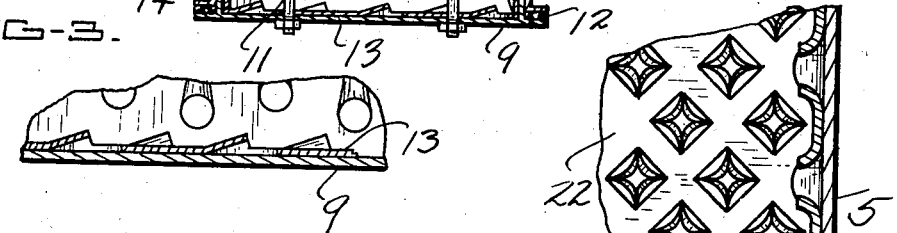
Fig. 3 is a fragmentary sectional view, showing an enlarged cross section of the bottom.
Figure 4:
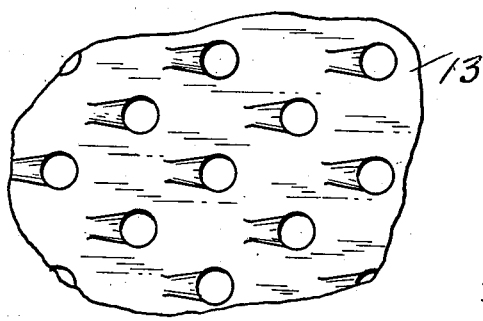
Fig. 4 is a top plan view of Fig. 3.

In the accompanying drawing wherein for the purpose of illustration is shown a preferred embodiment of my invention, and by viewing Fig. 1, it will be noted that the numeral 5 designates a casing having an inlet pipe 6 covered with a screen 7. An outlet pipe is shown at 8. The bottom of the casing 5 is shown at 9 and is held to the casing by bolts 11. This bottom is held to the casing 5 against a gasket 12 and has its inner surface provided with a plate 13 having raised projections thereon. A baffle is also formed at 14. Within the casing 5 is a circuitous passage 16, which is formed by the introduction of traps, 17, 18, 19, and 21. Each trap consists of a plate extending out into the casing bent upon itself so as to form a pocket, and the inner surface of the casing is lined with sheet metal 22 having inwardly punched out openings 22' provided with sharp edges. (See Fig. 2.) In order to simplify the drawing, this material 22 is partially eliminated from Fig. 1.

The result of this construction is that air entering the screen 7 moves into the passage 16 and encounters the rough surface 22 throughout the remainder of its travel. The heavier particles of dirt will be caught in the trap 17. Then as the air turns downwardly toward the trap 18, these particles will slide thereinto; and as the air passes toward the trap 19, this will further arrest dust particles, and the same will be true in the trap 21. The baffle 14 and removable bottom will arrest the balance of the dirt so that when the air passes up the passage 23 and out the pipe 8, it will be thoroughly cleaned. The grater-like material 22 causes the dirt to form into little pellets which gradually accumulate and finally drop off into the traps. I have found that the introduction of this material is highly important in that fine dirt could be carried through the device but by forming pockets and points for this fine dust to collect, the same will accumulate into heavy particles and finally reach one of the traps.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In an air conditioner, a casing, a removable bottom therefor, said bottom having a trap formed therein and having its bottom inner surface covered with a plate provided with raised portions forming pockets thereon, a circuitous passage formed through said casing, dirt traps formed in said passage, and a lining within said passage and formed of sheet metal having inwardly punched openings provided with sharp edges adapted to collect the dust.

2. In an air conditioner, a casing, traps formed in the bottom of said casing, a plate covering said bottom and provided with raised portions forming pockets thereon, a circuitous passage formed through said casing, horizontal dirt traps formed in said passage and arranged in staggered relation, and a lining within said passage and formed of sheet metal having inwardly punched openings provided with sharp edges adapted to collect the dust.

GEORGE E. TIGNER.